United States Patent [19]
Moffatt

[11] 3,861,643
[45] Jan. 21, 1975

[54] SATURATING MAGNETIC CONTROL VALVE

[75] Inventor: Elbert M. Moffatt, Glastonbury, Conn.

[73] Assignee: United Aircraft Corporation, East Hartford, Conn.

[22] Filed: Oct. 5, 1973

[21] Appl. No.: 404,085

[52] U.S. Cl. ................................ 251/129, 251/141
[51] Int. Cl. ............................................ F16k 31/06
[58] Field of Search .......................... 251/141, 129

[56] References Cited
UNITED STATES PATENTS

| | | | |
|---|---|---|---|
| 2,844,157 | 7/1958 | Griffith | 251/129 X |
| 2,881,980 | 4/1959 | Beck et al. | 251/141 X |
| 3,521,854 | 7/1970 | Leiber et al. | 251/141 X |
| 3,647,177 | 3/1972 | Lang | 251/141 X |

FOREIGN PATENTS OR APPLICATIONS

| | | | |
|---|---|---|---|
| 471,427 | 9/1937 | Great Britain | 251/129 |

Primary Examiner—Arnold Rosenthal
Attorney, Agent, or Firm—Donald F. Bradley

[57] ABSTRACT

An electromagnetic proportional ball type flow control valve is disclosed in which electric current supplied to the coil of an electromagnet produces a force to control a moving armature to which a ball valve is attached, the ball being seated on a port through which the flow of fluid is regulated. The armature and the ball valve are supported by four flexures to constrain movement in directions other than the desired direction and to eliminate friction. The magnetic circuit for the electromagnet is varied by means of saturating gaps made as annular grooves in the magnetic path to modify the shape of the force-displacement curve and produce improved control.

6 Claims, 6 Drawing Figures

FUEL OUT
FUEL IN

SATURATING MAGNETIC CONTROL VALVE

BACKGROUND OF THE INVENTION

This invention relates to an improved, low cost proportional flow control valve. The valve is characterized by a movable armature supported by frictionless flexures and controlled by an electromagnetic having saturating gaps in the magnetic path for improved regulation of the valve in response to a driving current.

Proportional type control valves such as are used to regulate fluid flow in a control system are well known, and numerous such valves exist. For low cost controls, however, there is not presently available a valve which is accurate and sensitive and which at the same time permits the response curve to be shaped to a specific nonlinear output. Existing valves which exhibit linear force-displacement curves and low hysteresis tend to be heavy and expensive, while smaller low cost valves do not generally exhibit sufficient accuracy and have undesirable force-displacement curves or are otherwise unsuitable.

SUMMARY OF THE INVENTION

The present invention is a low cost proportional flow control valve which is lightweight, accurate and rugged, has low hysteresis, and is very flexible in that the response curve can be shaped to a specific linear or nonlinear output to satisfy the requirements of many systems. No permanent magnet is required as in many prior art valves, a feature which reduces both cost and weight.

In accordance with the preferred embodiment of the invention, the valve consists of an electromagnet actuated by the electric current into a solenoid for varying the position of an armature to which is connected a ball shaped valve member. The ball seats on a port through which the flow of fluid is regulated. The armature is supported by four flexures which constrain the movement of the valve member to a desired direction and provide a substantially frictionless spring force to maintain the ball in its seated position.

The force-displacement curve of the valve may be shaped to meet the specific linear or nonlinear output requirements of the control system by means of the addition of saturating gaps such as annular grooves or a curved gap in the central magnetic path of the electromagnet.

Other features and advantages of the present invention will be apparent by reference to the description of the preferred embodiment.

DESCRIPTION OF THE PREFERRED EMBODIMENT

Figure 1:
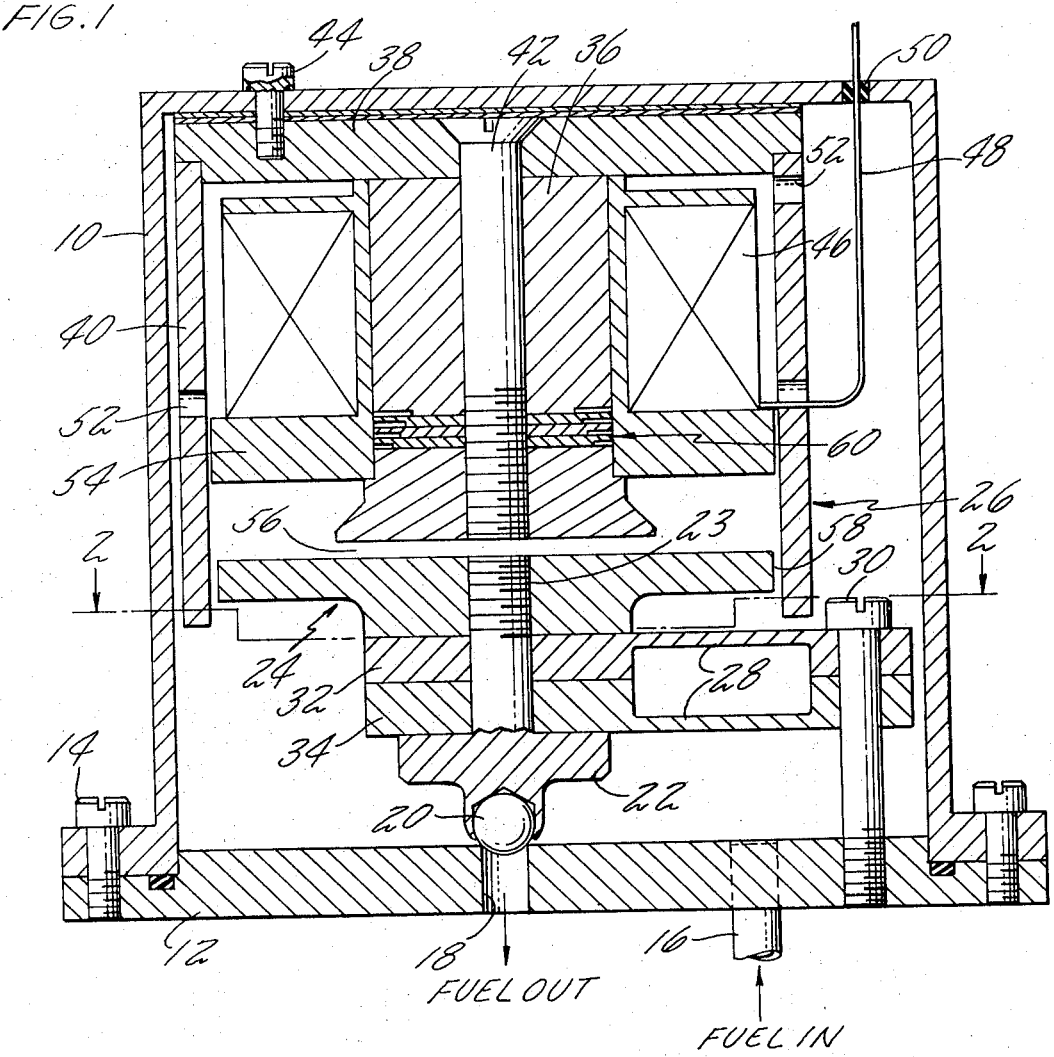
FIG. 1 is a cross-sectional view in elevation of the control valve.
Figure 2:
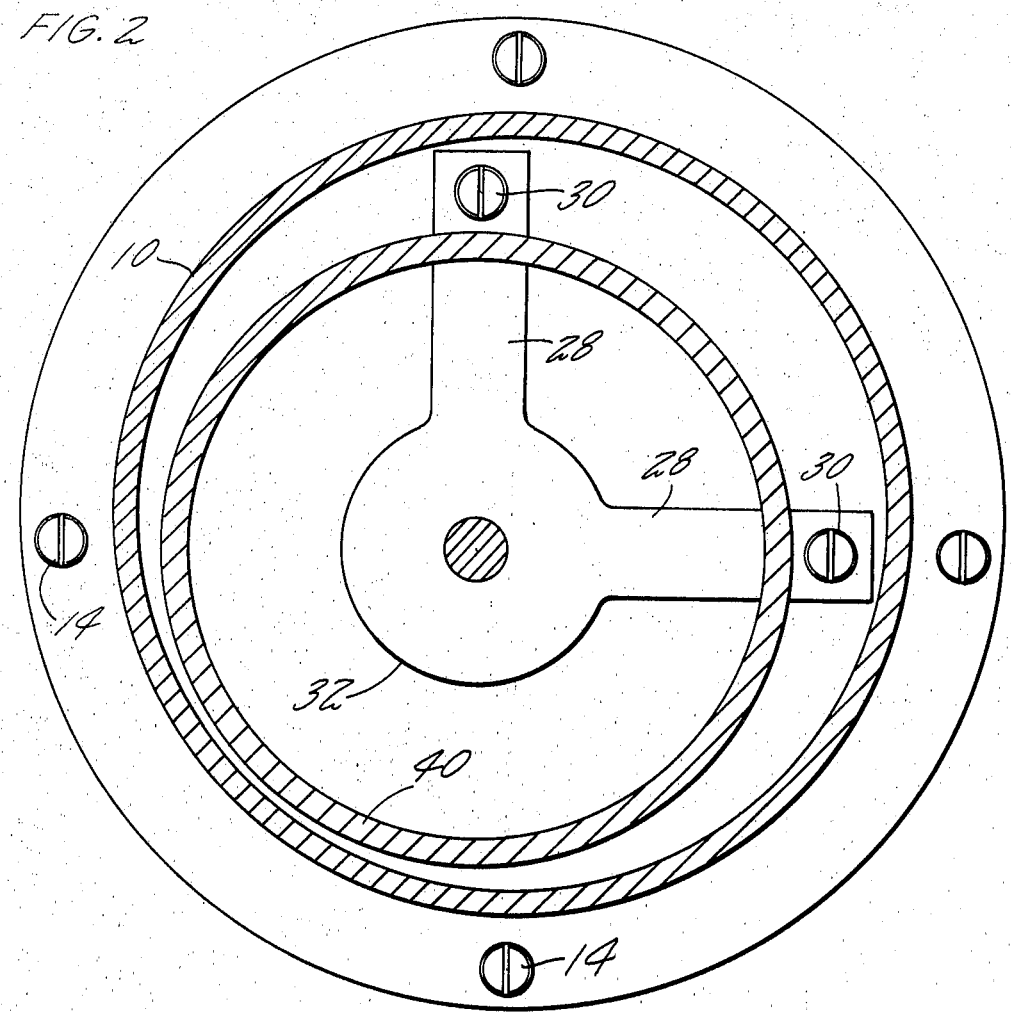
FIG. 2 is a top view of the valve of FIG. 1.

A preferred embodiment of the proportional saturating magnetic control valve is shown in FIGS. 1 and 2. The valve will be described as being a fluid flow regulating valve such as may be used in a fuel control, but it is apparent that the principles of this invention are applicable to other types of proportional control valves.

The operating components of the valve are mounted within a sealed enclosure comprising a cover 10 and a bottom 12, the members 10 and 12 being held securely together to form the enclosure by a plurality of screws 14.

The fuel whose flow is regulated by the valve is fed into the valve through a port 16 located in the bottom 12. The fuel is injected into the enclosure at a pressure higher than the combustion chamber pressure (fuel out pressure). Typically, it is 20 to 200 psi higher than atmosphere. Some of the fuel flows through passages within the valve enclosure to cool the coil. Fuel is metered out through the orifice 18 sealed by ball 20. Control of the fuel flow through this orifice is dependent on both the differential pressure across the orifice and the valve opening. The seat for ball 20 is preferably formed from a relatively soft material such as aluminum.

The ball 20 is supported within a recess at the bottom of a nonmagnetic plunger shaped valve member 22. The ball may rotate within the recess, but this is not a requirement of the invention. Valve member 22 includes a shaft portion which is secured at its upper end by means of screw threads 23 to a round disk or armature 24 which is the magnetically soft moving part of an electromagnet shown generally at 26. The armature 24 is displaced vertically upward by the electromagnet 26 and thus moves the ball 20 away from its seat in response to an energizing current.

The armature 24 and valve member 22 are mounted on four flexure members 28 which form a double parallel arm linkage and which confine the motion of the armature 24, valve member 22 and ball 20 to a substantially linear movement along the axis of the port 18. The flexure members 28 are mounted in parallel pairs, one pair being 90° removed from the other pair circumferentially about the axis of port 18 and each pair comprising two vertically separated flexure members. The flexures 28 are made from spring steel and are fixedly attached to the enclosure bottom 12 by means of a screw 30. As seen in the FIGS. 1 and 2 the two topmost flexure members may be machined or formed from a single metallic piece 32 and the two lowermost flexure members may be formed from another metallic piece 34. The shaft portion of valve member 22 passes through holes within the center of the metallic pieces 32 and 34. By means of the support provided by flexures 28, the armature 24 cannot tip or rub, and all static friction is eliminated. The flexures 28 also supply the restoring spring force required by the valve, i.e., the ball 20 is seated in port 18 by the normal spring force provided by the flexure members 28 in the absence of a counteracting force exerted on armature 24 by electromagnet 26.

The electromagnet 26 which supplies a vertical upward force to armature 24 consists of a center core 36 of magnetic material, a top plate 38 of magnetic material, and a circular sidewall 40 of magnetic material, the wall 40 extending vertically slightly below the armature 24. The center core 36 is fixed with respect to the top member 38 by means of a nonmagnetic screw 42, while the cover 10 is attached to the top plate 38 by a pressure sealing screw 44. The electromagnet is energized by a solenoid 46 which comprises several hundred turns of wire to which electrical current is supplied through leads 48 which pass through a pressure-tight fitting 50. Several small holes 52 may be provided in the sidewall 40 for the fuel to circulate and cool the solenoid 46. A nonmagnetic support 54 is provided for the solenoid wires. A gap 56 is provided between the bottom of the center core 36 and the armature 24, while a small gap 58 is provided between the side of armature 24 and sidewall 40.

Electrical current supplied through wires 48 by means of an adjustable current supply, not shown, produces a magnetic force in electromagnet 26 and causes vertical movement of armature 24 which in turn opens the port 18 and causes fuel to pass through the port 18.

In an ordinary tractive type of electromagnet as shown herein, the force produced by the electromagnet 26 tends to vary inversely with the air gap 56 for a fixed electric current. If opposed by a spring, the deflection of the armature 24 is nonlinear and the operation inefficient in terms of power and size. The present valve uses unique saturating magnetic sections shown at 60 to modify the force-displacement curve and improve the operation of the valve. In order to clearly illustrate this mode of operation, the operation of a conventional valve will be described.

Figure 3:
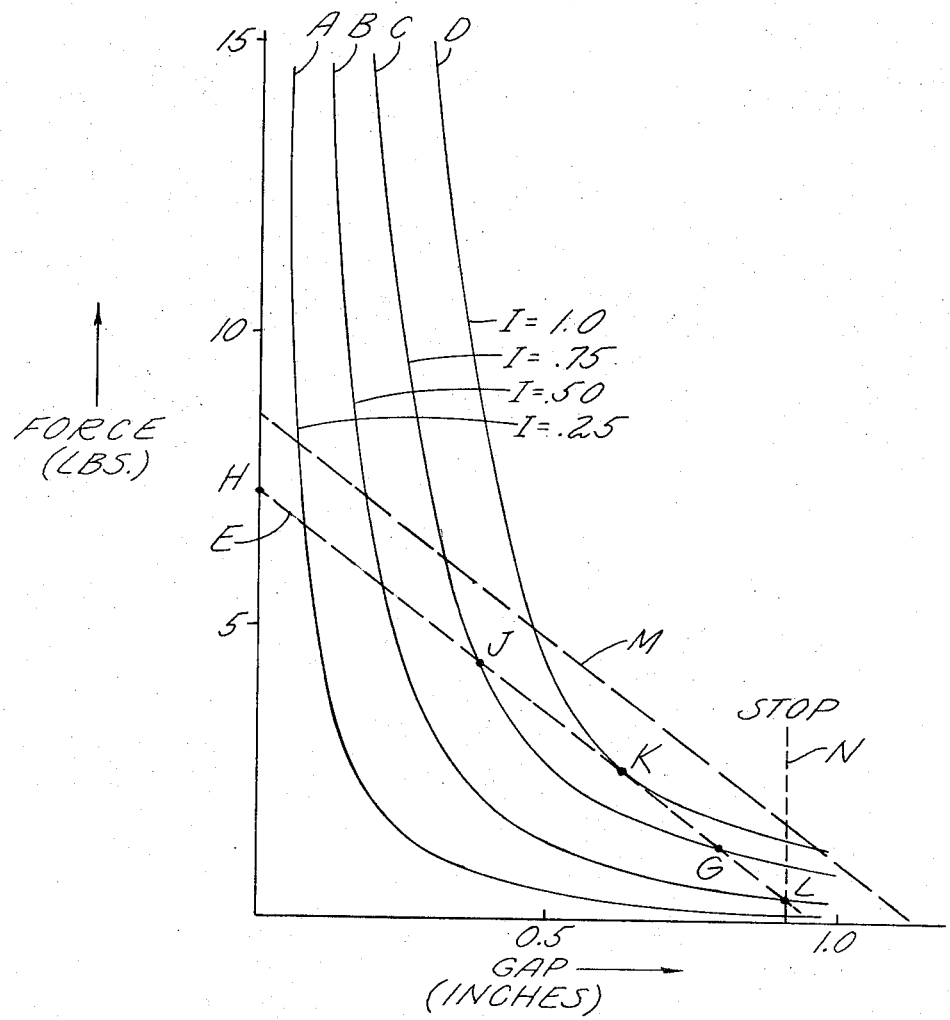
FIG. 3 is a graph showing the force-displacement curves of a typical electromagnet with variations in current.

When the movement of a valve is opposed by a spring or a fixed force, the position of the valve as a function of applied electric current can be calculated from a family of curves as shown in FIG. 3. The curves show the force in pounds applied to the armature 24 as a function of the gap 56 between the armature 24 and the electromagnet for different values of electric current. The current lines A, B, C and D correspond to a force tending to close the gap 56 (open the valve). A line E shows the spring force which forces the valve in the opposite direction, i.e., which tends to close the valve. The spring line E appears as a straight line with a negative slope. The intersection of the spring line E with the force-displacement current curves A through D produces the operating curve for the valve in which the gap is plotted against current. This operating curve is illustrated in FIG. 4 as curve F.

For standard prior art valves of this type, there is only a limited range of stable operation. For example, on the curve C of FIG. 3, the stable position can be either G or H. The design position is G. For any gap lying between G and J, the spring force is greater than the current force so it will tend to open the gap 56 further, i.e., close the valve. For any value of gap to the right of G, this force is reversed, hence the spring will reset the gap at G if it is disturbed in either direction.

If the gap is forced to the left of J, that is, to open the valve, the current force is now larger than the spring and in a direction to drive the gap 56 still smaller so that the armature 24 will move to position H or until it hits a stop. Since this position H is stable for all current values, all control is lost if the armature moves to this position.

Figure 4:
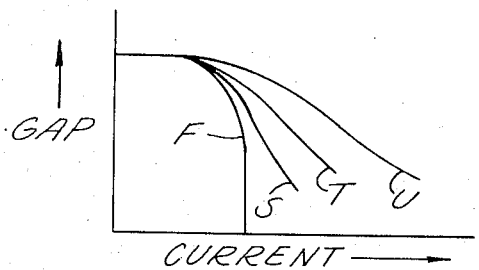
FIG. 4 shows in graph form typical valve operating curves.

Points K and L shown on FIG. 3 are also points on the stable curve F shown in FIG. 4.

Other forces acting on the valve can also be analyzed from the curve of FIG. 3. The effect of a constant force such as fluid pressure which aids the spring is shown by a straight line M parallel to the original spring line but displaced upward by the amount of the force.

A stop in the maximum gap position is shown by a line N which intersects the spring line together with line B at L and shows that for this condition of valve operation the current offset at opening is about 0.50.

Curve F of FIG. 4 shows that the characteristics of this simple valve are poor in terms of efficiency in range. To produce any type of linearity, a large air gap and a stiff spring must be used, these conditions requiring high power and a large initial offset current. In addition, the minimum air gap must be set by a stop so that the valve will never reach the point of instability.

In the present invention, saturating gaps 60 in FIG. 1 are built into the center core 36 of the magnetic circuit to modify the shape of the force-displacement curves. As shown in FIG. 1, the saturating gaps are made as annular grooves in the central magnetic path. All the flux except for a slight coil leakage component is forced through this portion of the central core 36. Four such gaps are shown, each having a different width and a different depth. The design is based on the theory that below a certain flux density, the magnetic material remaining inside each of the grooves 60 will conduct all the magnetic flux with no coercive force. At a certain flux level, depending on the magnetic material, the magnetic material adjacent the gap 60 will saturate so its permeance becomes equal to an air gap of the same size. Since the flux level depends on the current, in effect at a certain current and force level a new air gap is added in series with the main gap.

Figure 5:
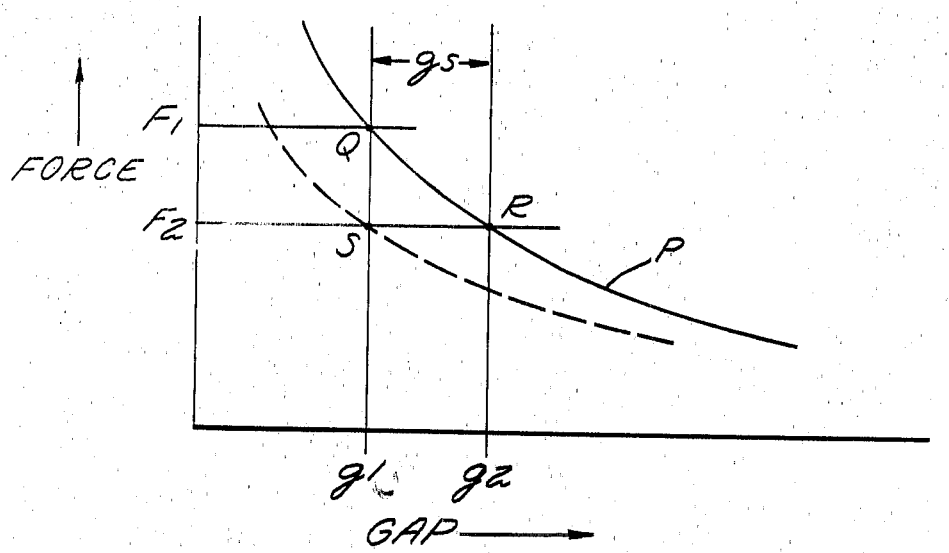
FIG. 5 is a graph showing the resultant force-displacement curve of the present valve using saturating gaps in the magnetic path.

The effect of the saturating gaps 60 on the force-displacement curve can be shown in FIG. 5 where a current line P is plotted against force F and gap $g$ as in FIG. 3. If operation of the valve is set at point Q initially, and a gap of a width $g_R$ is added, the operating point will be driven down to a point R and the operating force will be reduced from force $F_1$ to $F_2$. However, the physical gap is still $g_1$ so that the new operating point will be at S which is defined by gap $g_1$ and by force $F_2$. This process occurs over the whole curve so that the new current curve is moved down and flattened. Since a number of gaps 60 can be used and can be made to saturate at different current levels, each current curve can be shaped independently and a whole new family of curves developed.

Some of the possible control curves that may be generated by the use of saturating gaps are shown as lines S, T and U in FIG. 4. Except for the initial current offset, the curves can be made linear or can be shaped as desired. Curve T is a good shape for a fuel control because it produces a gain change that improves stability. Compared with curve F which is produced by typical prior art valves, the improvements of the present invention include a larger operating current range, control of the curve shape and reduced maximum required power.

Figure 6:
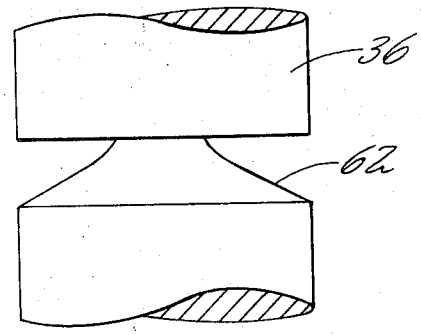
FIG. 6 shows an alternate design of saturating gap.

Instead of using separate saturating gaps 60, all the gaps can be combined into one shaped gap 62 as shown specifically in FIG. 6. This curved gap 62 acts in the same manner as the discrete gaps 60 except that the varying cross sections of magnetic material can saturate continuously instead of at discrete flux levels as with the independent gaps 60 of FIG. 1.

When used in conjunction with a fuel control, a bellows may be added to the valve in order to counterbalance the differential force or pressure drop caused by the fuel flow through the port 18.

It will also be apparent to those skilled in the art that changes may be made to the construction and arrangement of parts without departing from the scope of the invention as hereinafter claimed.

I claim:

1. A control valve comprising an electromagnet including a solenoid and a core member of magnetic material, at least a portion of said core member being positioned axially within said solenoid, an armature comprising a disk of magnetic material spaced from said core member by a gap and adapted for movement relative to said core member by virtue of an actuating force produced by said electromagnet in response to the flow of electric current in said solenoid, a valve member extending axially from the center of said armature and movable therewith along the axis of said solenoid, said valve member being adapted to regulate a variable in a process in response to movement thereof, and flexure means comprising first and second thin, narrow rods extending radially from said valve member and secured at the opposite ends thereof, said first and second rods being in the same plane and being 90° removed from each other about the axis of said solenoid, said rods constraining movement of said valve member to a direction along the axis of said solenoid.

2. A control valve as in claim 1 in which said flexure means additionally provides to said valve member a biasing force to oppose a reduction of said gap.

3. A control valve as in claim 1 in which said valve member includes a ball adapted to seat upon a port in a bounding wall, said flexure means biasing said ball in a direction to close said port.

4. A control valve as in claim 3 and including a sealed enclosure surrounding said valve member, said port being contained in one wall of said enclosure, and further including a fluid supply means in a wall of said enclosure for providing a fluid under pressure into said enclosure, said valve member regulating the flow of said fluid through said port.

5. A control valve as in claim 1 in which said flexure means further includes third and fourth thin, narrow rods parallel to and axially removed from said first and second rods for preventing skewing of said valve member relative to the axis of said solenoid.

6. A control valve as in claim 1 and including a plurality of annular grooves located in said core member to form in said core member a plurality of discrete sections of different cross-sectional areas which magnetically saturate at different levels of flux density to thereby effect a change in the actuating force produced by said electromagnet.

* * * * *